United States Patent
Wong et al.

(10) Patent No.: US 7,928,671 B1
(45) Date of Patent: Apr. 19, 2011

(54) ILLUMINATION INTENSITY CONTROL

(75) Inventors: Lik-Kin Wong, Tai Po (HK); Tze-Kau Man, Yuen Long (HK)

(73) Assignee: National Semiconductor Corporation, Santa Clara, CA (US)

( * ) Notice: Subject to any disclaimer, the term of this patent is extended or adjusted under 35 U.S.C. 154(b) by 560 days.

(21) Appl. No.: 11/843,837

(22) Filed: Aug. 23, 2007

(51) Int. Cl.
*H05B 37/00* (2006.01)
(52) U.S. Cl. .................. 315/360; 315/291; 315/307
(58) Field of Classification Search .............. 315/246, 315/360, 291, 307
See application file for complete search history.

(56) References Cited

U.S. PATENT DOCUMENTS

| 4,286,195 A | * | 8/1981 | Swinea, Jr. ............... 315/224 |
| 6,016,038 A | | 1/2000 | Mueller et al. |
| 6,628,109 B2 | | 9/2003 | Rincon-Mora |

* cited by examiner

*Primary Examiner* — David Hung Vu
(74) *Attorney, Agent, or Firm* — Matthew M. Gaffney; Frommer Lawrence & Haug LLP

(57) ABSTRACT

A method for controlling average current. The method enables control of average current independent of instantaneous current. The average current is controlled by changing the number of unit pulses provided during a time interval. The unit pulses are used to switch the delivery of current to the load.

20 Claims, 8 Drawing Sheets

| INTERVAL NUMBER | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| NUMBER OF UNIT PULSES | 1 | 1 | 1 | 2 | 3 | 3 | 3 | 3 | 5 | 5 | 5 | 2 | 2 | 2 | 2 | 2 | 2 | 1 | 1 |
| EFFECTIVE DUTY CYCLE (%) | 12 | 12 | 12 | 24 | 36 | 36 | 36 | 36 | 60 | 60 | 60 | 24 | 24 | 24 | 24 | 24 | 24 | 12 | 12 |

$T_{DIM} = 1MS$;  $T_{PULSE} = 125US$;  $T_{ON} = 120US$;  $T_{OFF} = 5US$

FIG. 5

ILLUMINATION INTENSITY CONTROL

TECHNICAL FIELD

The invention is generally directed to the area of current control. The invention is directed, particularly, but not exclusively to a method, an apparatus, and a manufacture for controlling average current.

BACKGROUND

Certain electronic devices and circuits employ current regulators to provide a relatively constant average current. For example, certain illumination devices provide illumination at an intensity related to the average current through the device. By selectively regulating the average current to different values at different times, an illumination device may be used to provide illumination at selectable intensity levels.

The average current may be changed by controlling the instantaneous current to the load. In certain illumination devices, the emitted color spectrum may be related to the instantaneous current through the device. For example, many light emitting diodes (LEDs) provide light at different wavelengths when driven at differing levels of instantaneous current. In this example, independent control of the average current and the instantaneous current allows for independent control of the emitted color spectrum and the intensity of the illumination.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein:

FIG. 5 is a chart illustrating a relationship between the number of unit pulses provided during consecutive time intervals and the effective duty cycle according to an embodiment of the present invention;

DETAILED DESCRIPTION

Various embodiments of the present invention will be described in detail with reference to the drawings. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference. References in the singular are made merely for clarity of reading and include plural reference unless plural reference is specifically excluded. The meaning of either "in" or "on" includes both "in" and "on." The term "or" is an inclusive "or" operator, and is equivalent to the term "and/or" unless specifically indicated otherwise. The term "based on" or "based upon" is not exclusive and is equivalent to the term "based, at least in part on," and includes being based on additional factors, some of which are not described herein. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function or functions. The term "signal" means at least one current, voltage, charge, temperature, data, or other signal. A "signal" may be used to communicate using active high, active low, time multiplexed, synchronous, asynchronous, differential, single-ended, or any other digital or analog signaling or modulation techniques. The phrase "in one embodiment," as used herein does not necessarily refer to the same embodiment, although it may.

Briefly stated, the invention is related to a method, an apparatus, and a manufacture for controlling average current. The method enables control of average current independent of instantaneous current. The average current is controlled by changing the number of unit pulses provided during a time interval. The unit pulses are used to switch the delivery of current to the load.

Figure 1:
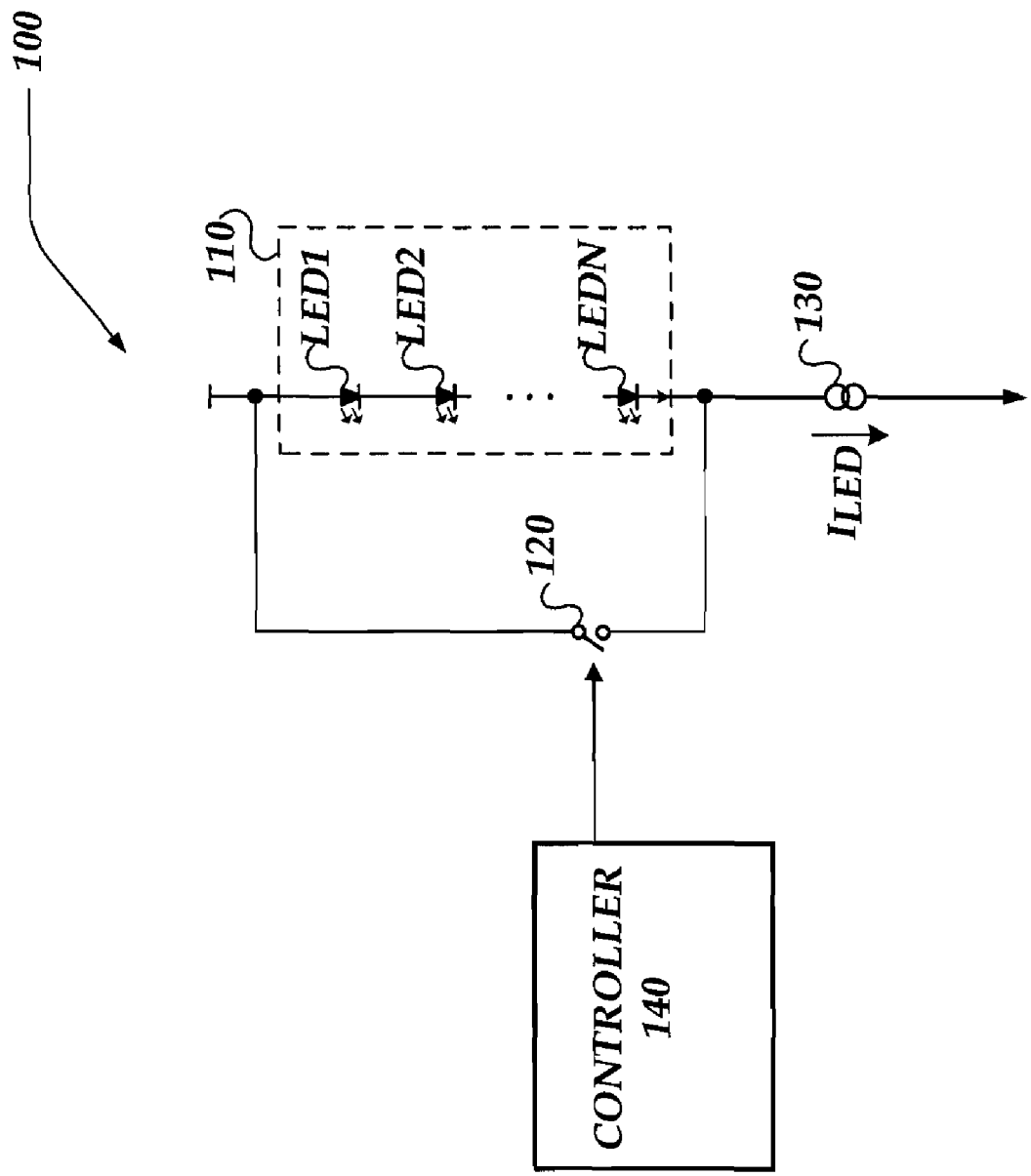
FIG. 1 is a block diagram of an embodiment of a system according to aspects of the present invention.

FIG. 1 is a block diagram of an embodiment of system 100. System 100 includes illumination device 110, switching circuit 120, current source 130, and controller 140. System 100 is arranged to selectively provide current $I_{LED}$ to illumination device 110. System 100 is further arranged to control the average value of current $I_{LED}$ by selectively opening and closing switching circuit 120.

In one embodiment, illumination device 110 is a LED, a string of LEDs, array of LEDs, electroluminescent device, other illumination device, and/or the like. In this embodiment, system 100 may be employed to control the current through illumination device 110 such that it can provide illumination at multiple intensity levels. For example, if employed with a photography system, these intensity levels may include an "off" level, a "preview" level, a "flash" level, and/or the like. If employed with a television display, computer monitor, mobile device display, and/or the like, these intensity levels may provide multiple display intensity setting to optimize between brightness and power consumption.

System 100 may also be employed to provide current to a non-illumination device load. Such load may be any electrical load through which electrical current flows. For example, system 100 may supply current to an electronic device or circuit such as a computer, television, mobile device, wireless device, motor, and/or the like. These and other applications are within the spirit and scope of the invention.

In one embodiment, switching circuit 120 is provided to selectively shunt current away from illumination device 110. For example, switching circuit 120 may provide a low impedance current path which bypasses illumination device 110. Switching circuit 120 may be any type of switching circuit. In one embodiment, switching circuit 120 is an electronically controlled switch. For example, N-channel MOSFET devices, P-channel MOSFET devices, BJT transistors, JFET transistors, relays, and/or the like, and combinations thereof, may be employed to form switching circuit 120.

Current source 130 is arranged to provide a substantially constant current $I_{LED}$ that may be selectively supplied to illumination device 110 while switching circuit 120 is open. Current source 130 may provide current $I_{LED}$ of any magnitude that is suitable for a particular application. In one embodiment, a current mirror is employed as current source 130. In other embodiments, Cascode current sources, switching current regulators, linear current regulators, and/or the like, may be suitably employed. Current source 130 may be buffered or unbuffered. Current source 130 may also be regulated or unregulated.

Controller 140 is arranged to provide a plurality of unit pulses during a time interval (such as time interval $T_{dim}$ of FIG. 4) to control the opening and closing of switching circuit 120. In one embodiment, controller 140 is a programmable microcontroller that is configured to enable current flow through illumination device 110 in the manner discussed below. In other embodiments, controller 140 may be a microprocessor, analog hardware, discrete digital hardware (combinatorial or state-based), programmable logic, an application specific integrated circuit (ASIC), and/or the like, and combinations thereof. In an embodiment where a microprocessor is employed in controller 140, controller 140 may include a microprocessor core, memory, input/output registers, and a bus to interconnect these elements.

In at least one embodiment, system 100 differs from the illustrated embodiment. For example, switching circuit 120 may be integrated with controller 140 and/or current source 130; current source 130 may be coupled to a different positive or negative supply voltage potential; and/or the like.

Figure 2:
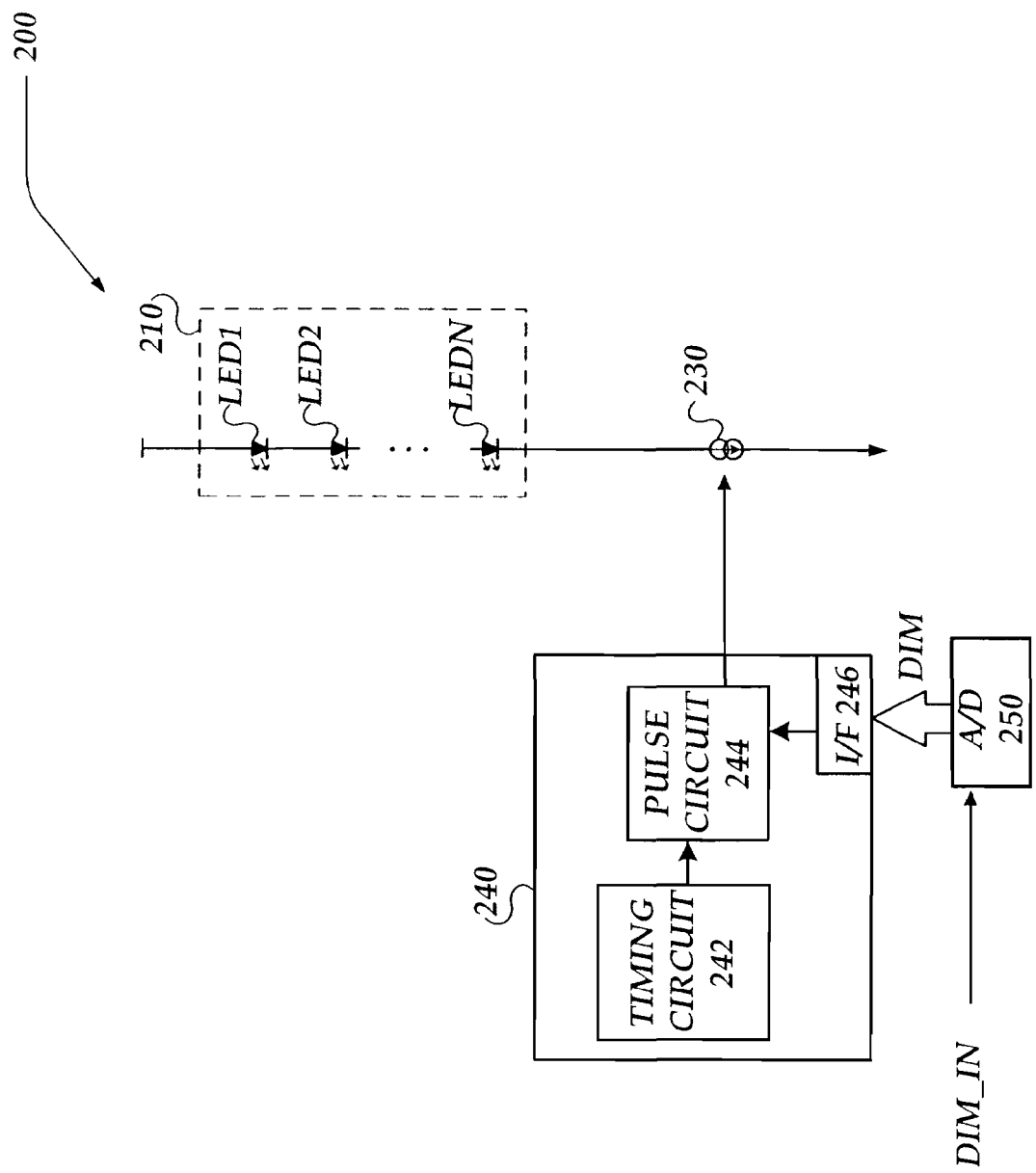
FIG. 2 is a block diagram of another embodiment of a system according to aspects of the present invention.

FIG. 2 is a block diagram of an embodiment of system 200. System 200 is arranged to control the average value of current $I_{LED}$ by selectively enabling and disabling current source 230.

Illumination device 210 may be similar to illumination device 110 of FIG. 2.

Current source 230 is arranged to selectively provide a substantially constant current $I_{LED}$ to illumination device 210. In one embodiment, current source 230 is current source that is arranged to receive an enable signal. When the enable signal is asserted, current source 230 provides a substantially constant current $I_{LED}$. When the enable signal is de-asserted, current source 230 provides substantially no current. In one embodiment, current source 230 is a Widlar current mirror and an enable signal is employed to selectively ground the gates of the current mirror transistors. Other circuits and methods for enabling and disabling a current source are within the spirit and scope of the invention.

Controller 240 may be an embodiment of controller 140 of FIG. 1. Controller 240 is arranged to provide a plurality of unit pulses during a time interval (such as time interval $T_{dim}$ of FIG. 4). In one embodiment, controller 240 includes timing circuit 242, pulse circuit 244, and interface 246. Timing circuit 242 is arranged to provide a timing signal to pulse circuit 244. In one embodiment, the timing signal is a clock signal. This timing signal may be internally or externally generated. In one embodiment, timing circuit 242 is a crystal controlled oscillator or a voltage controlled oscillator. In one embodiment, controller 240 also includes a driver (not shown) to control current source 230.

In one embodiment, pulse circuit 244 is arranged to receive a timing signal from timing circuit 242 and to employ the timing signal to provide the plurality of unit pulses. Registers, timers, combinatorial logic, state based logic, and/or the like, and combinations thereof, may be employed to provide the unit pulses. In one embodiment, a microprocessor is employed as pulse circuit 244, and includes a microprocessor core, memory, input/output registers, and a bus to interconnect these elements. The providing of the unit pulses is discussed in further detail below.

Additionally, signal DIM may be received at interface 246 of controller 240. The output of controller 240 may be based on the value of signal DIM. For example, a value on signal DIM may represent the number of unit pulses which are to be provided during a time interval.

In one embodiment, system 200 includes analog-to-digital converter (ADC) 250 that is arranged to receive control signal(s) DIM_in and is further arranged to provide control signal(s) DIM to controller 240. ADC 250 may be a direct conversion ADC, a successive approximation ADC, a Sigma-Delta ADC, a pipeline ADC, a dual slope ADC, and/or the like. In one embodiment, signal DIM_in is an analog signal which represents a number of unit pulses which are to be provided during a fixed time interval. Signal DIM_in may be provided by any suitable source. For example, signal DIM_in may be a user input, connected to the wiper terminal of a potentiometer, provided by a photosensitive diode to automatically adjust illumination intensity based on ambient light, and/or the like. In other embodiments, ADC 250 may be omitted, input signal DIM_in may be a digital input signal that is provided by a user or other circuitry, and/or the like.

In other embodiments, other circuits may be employed to selectively provide current to an illumination device. For example, a current source may be integrated within controller 240, may be shunted by controller 240, and/or the like.

Figure 3:
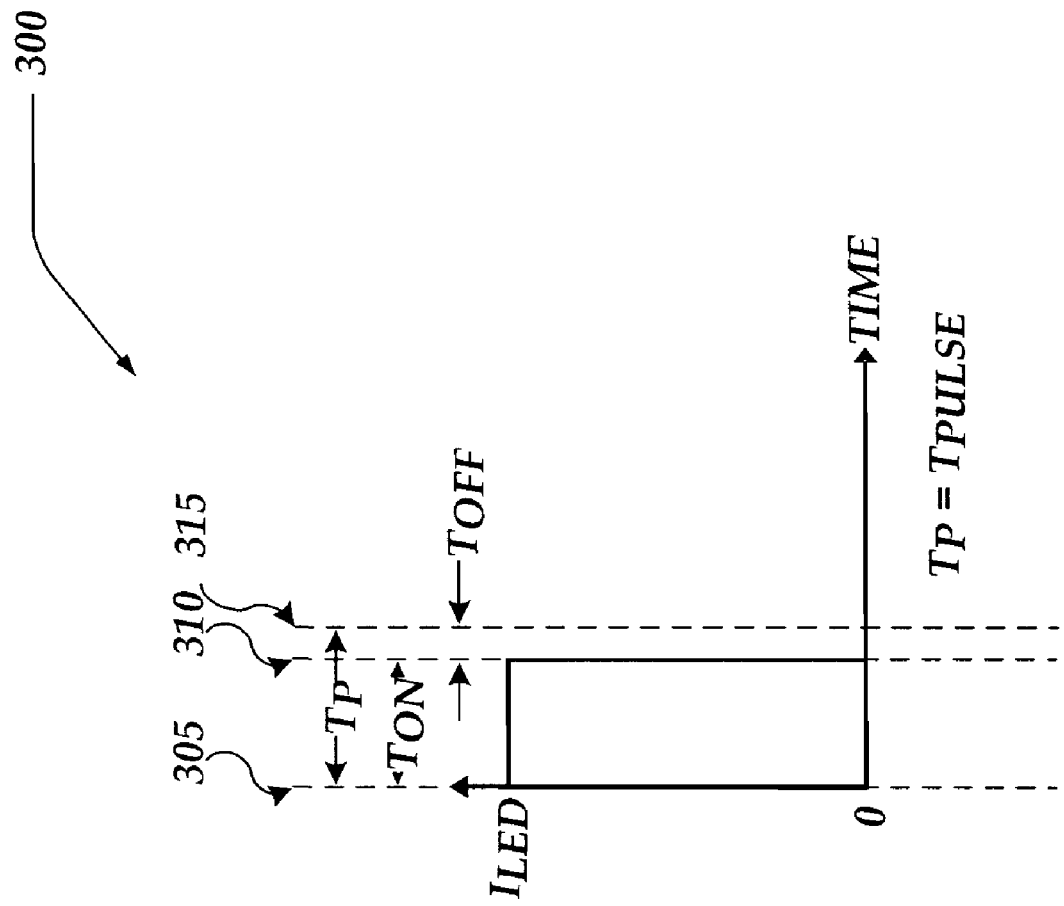
FIG. 3 is a timing diagram which illustrates a waveform of a unit pulse according to an embodiment of the present invention.

FIG. 3 is a timing diagram which illustrates a waveform of a unit pulse. Unit pulse 300 spans time $T_{pulse}$ and includes on-time $T_{on}$ and off-time $T_{off}$.

Unit pulse 300 may be provided by controller 140 of FIG. 1, controller 240 of FIG. 2, one-shot circuit(s), analog timing circuit(s), digital timing circuit(s), other micro-controller based timing control, and/or the like. Any suitable circuit or method may be employed to provide unit pulse 300. The durations of times $T_{pulse}$, $T_{on}$, and $T_{off}$ may also be set at any suitable lengths. In one embodiment, time $T_{pulse}$ is determined such that a binary multiple number of unit pulses are within a time interval (discussed in further detail below). Also, in other embodiments, off-time $T_{off}$ may be before on-time $T_{on}$.

In one embodiment, during on-time $T_{on}$, current $I_{LED}$ is provided to an illumination device. Further, as discussed above, current $I_{LED}$ may be provided by a current source.

Multiple unit pulses may be provided. For example, unit pulses may be provided back-to-back or after any suitable delay. Examples are provided below with regards to FIGS. 4 and 7.

Figure 4:
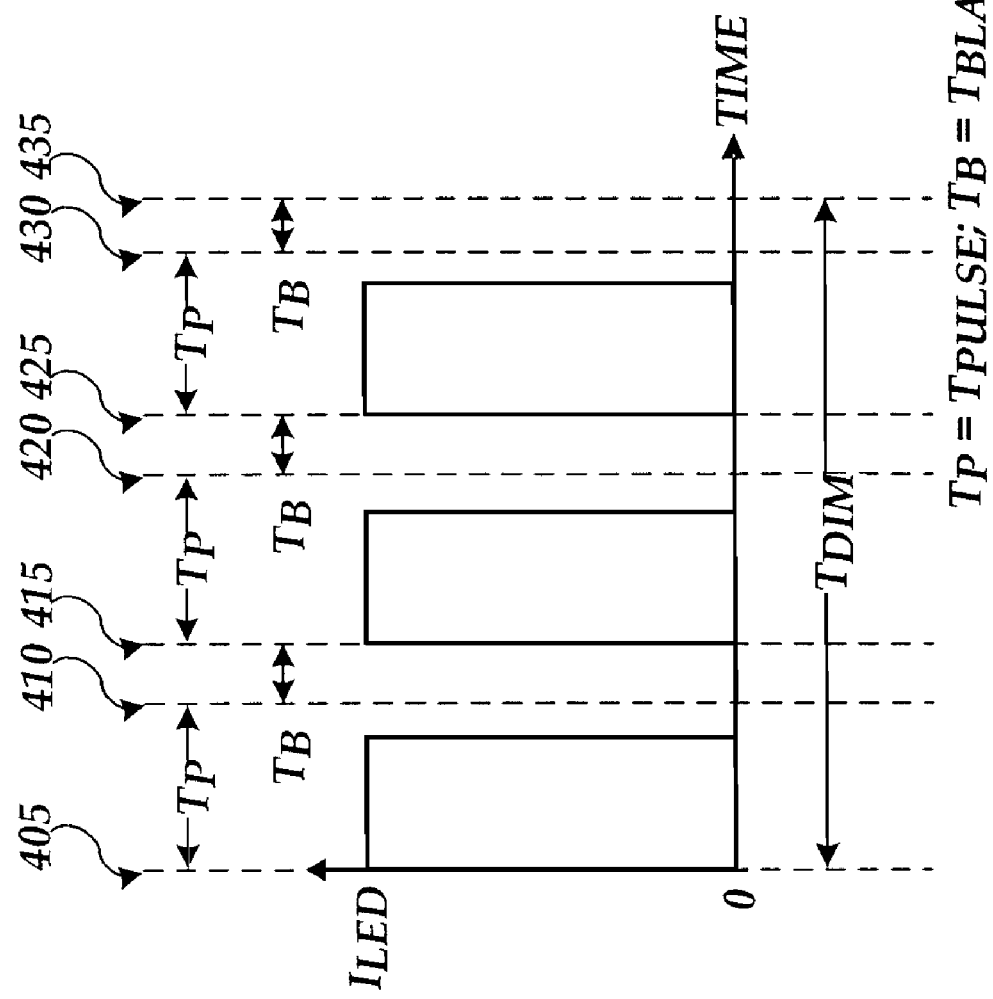
FIG. 4 is a timing diagram which illustrates a current control waveform according to an embodiment of the present invention.

FIG. 4 illustrates operation of a system in which a determined number of unit pulses are provided at substantially equally spaced intervals during time interval $T_{dim}$. In this embodiment, the intensity of illumination is proportional to the number of unit pulses provided during time interval $T_{dim}$.

Time interval $T_{dim}$ and on-time $T_{on}$ start at time 405. Between times 405 and 410, a unit pulse is provided. During the unit pulse on-time $T_{on}$, a substantially constant instantaneous current with value $I_{LED}$ is delivered to an illumination device. During the unit pulse off-time $T_{off}$, substantially no current is delivered to the illumination device. At time 410, blank-time $T_{blank}$ begins. During blank-time $T_{blank}$, substantially no current is provided to the illumination device. At times 415 and 425, additional unit pulses and blank-times $T_{blank}$ are provided. After time 435, time interval $T_{dim}$ may repeat for one or more cycles.

In this example, the total on-time in one time interval is (number of unit pulses*$T_{on}$)=$T_{on(total)}$. Also, the effective duty cycle of the waveform may be calculated as $T_{on(total)}/T_{dim}$. Likewise, the average current over time interval $T_{dim}$ may be calculated as $I_{LED}*(T_{on(total)}/T_{dim})$.

Blank-times $T_{blank}$ are interspersed between the provided unit pulses to space apart the unit pulses. In this embodiment, blank-time $T_{blank}$ varies depending on the number of unit pulses provided during time interval $T_{dim}$. In other embodiments, blank-time $T_{blank}$ may be fixed or zero. In at least one embodiment, the length of blank-time $T_{blank}$ is a result of the length of time interval $T_{dim}$, the length of time $T_{pulse}$, and the number of unit pulses provided during time interval $T_{dim}$.

In one example, time interval $T_{dim}$ is 20 ms, time $T_{pulse}$ is 2 ms, on-time $T_{on}$ is 1.8 ms, and off-time $T_{off}$ is 0.2 ms. In this example, three unit pulses are provided during one time interval $T_{dim}$. This results in an effective duty cycle of 27 percent and a blank-time $T_{blank}$ of 16/3 ms. Also, the maximum duration that the illumination device does not receive current is approximately 4.9 ms. As compared to a system in which a single 5.4 ms pulse is used to provide a 27 percent duty cycle, visible flickering is reduced while a substantially similar intensity of illumination is provided. In other examples, other values for time interval $T_{dim}$, time $T_{pulse}$, on-time $T_{on}$, and off-time $T_{off}$ may be employed.

In certain embodiments, it is beneficial to define time interval $T_{dim}$, time $T_{pulse}$, on-time $T_{on}$, and off-time $T_{off}$ such that flickering of the illumination device is less apparent. Typically, humans do not detect objectionable flickering if the time between on-times $T_{on}$ is less than approximately 20 ms. Thus, in one embodiment, time interval $T_{dim}$, time $T_{pulse}$, on-time $T_{on}$, and off-time $T_{off}$ may preferably be defined such that current is supplied to the illumination device at 50 Hz to 25 KHz intervals.

Also, time interval $T_{dim}$ and time $T_{pulse}$ may be set such that control over illumination is simplified. For example, time $T_{pulse}$ may be set such that the maximum number of times $T_{pulse}$ within a single time interval $T_{dim}$ is a power of two. This may enable simplified implementation of the invention within a micro-controller or micro-processor. After time 435, a new time interval $T_{dim}$ may begin.

FIG. 5 is a chart illustrating a relationship between the number of unit pulses provided during consecutive time intervals and the corresponding effective duty cycle.

In the illustrated example, time interval $T_{dim}$ is 1 ms, time $T_{pulse}$ is 125 us, on-time $T_{on}$ is 120 us, and off-time $T_{off}$ is 5 us. Accordingly, a maximum of 8 unit pulses may be provided during each time interval $T_{dim}$, and a single unit pulse provides an effective duty cycle of 12 percent. Here, the number of unit pulses provided during each time interval $T_{dim}$ determines the intensity of illumination.

Figure 6:
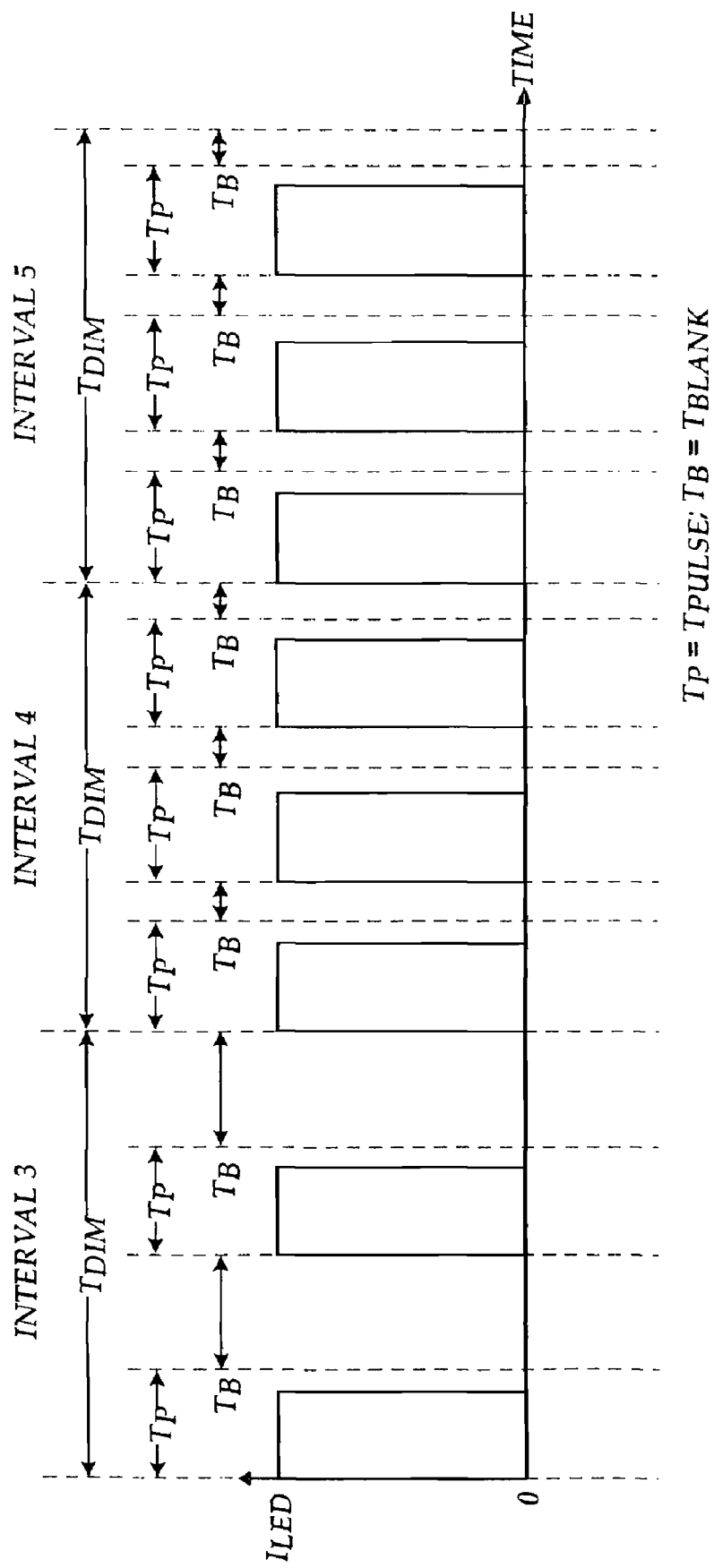
FIG. 6 is a timing diagram which illustrates a current control waveform according to an embodiment of the present invention.

FIG. 6 is a timing diagram which illustrates a current control waveform. FIG. 6 illustrates one embodiment of time interval 3 through time interval 5 of FIG. 5. FIG. 6 is not drawn to scale.

Figure 7:
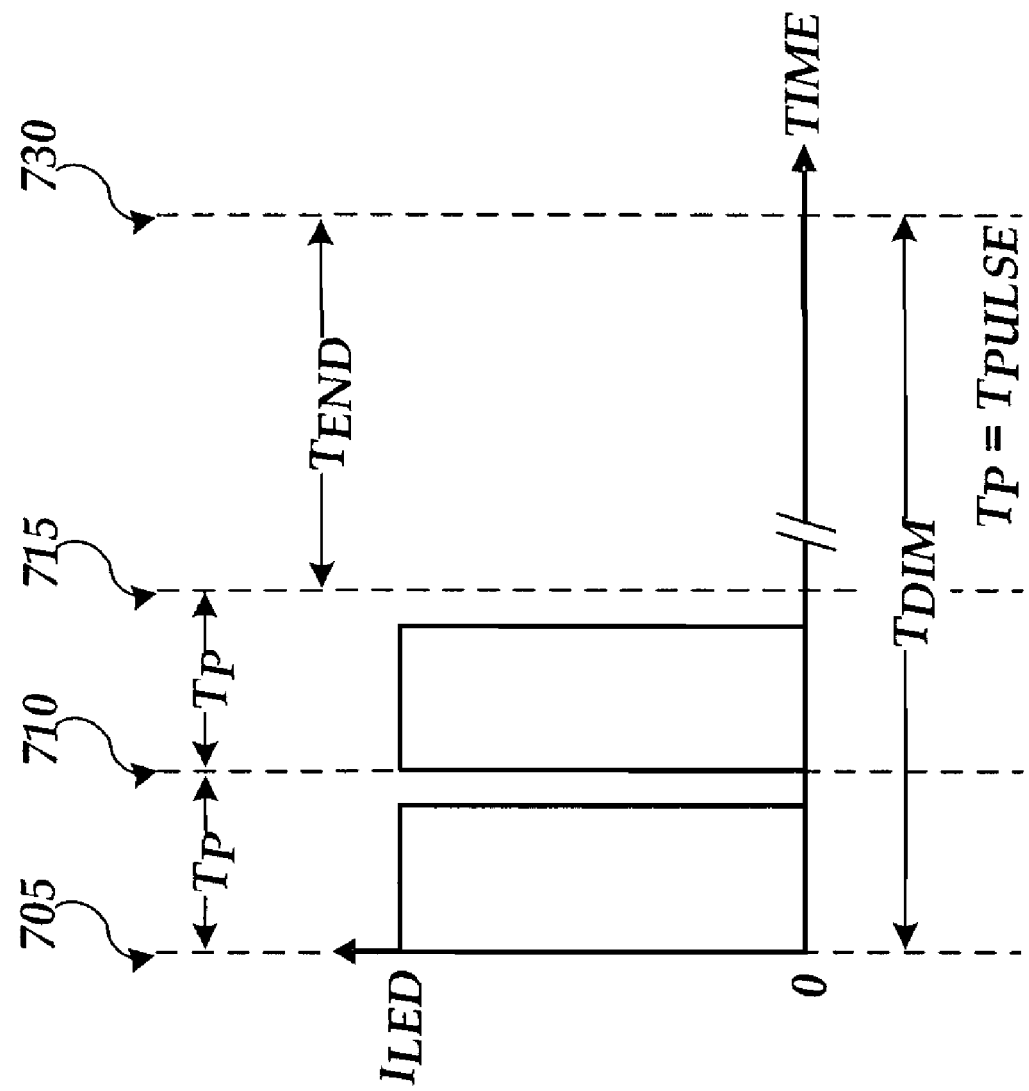
FIG. 7 is a timing diagram which illustrates another current control waveform according to an embodiment of the present invention.

FIG. 7 is a timing diagram which illustrates another current control waveform. For example, FIG. 7 illustrates operation of a system in which a determined number of unit pulses are provided substantially back-to-back at the beginning of time interval $T_{dim}$. In this example, blank-time $T_{blank}$ is zero, and the time with no pulses, $T_{end}$, is inversely related to the number of unit pulses provided during a time interval $T_{dim}$.

In other embodiments, a determined number of unit pulses may be provided substantially back-to-back at the beginning of time interval $T_{dim}$ and with additional unit pulses provided at the end of time interval $T_{dim}$, a determined number of unit pulses may be provided at any point within time interval $T_{dim}$, and/or the like. These and other embodiments are within the spirit and scope of the invention.

Figure 8:
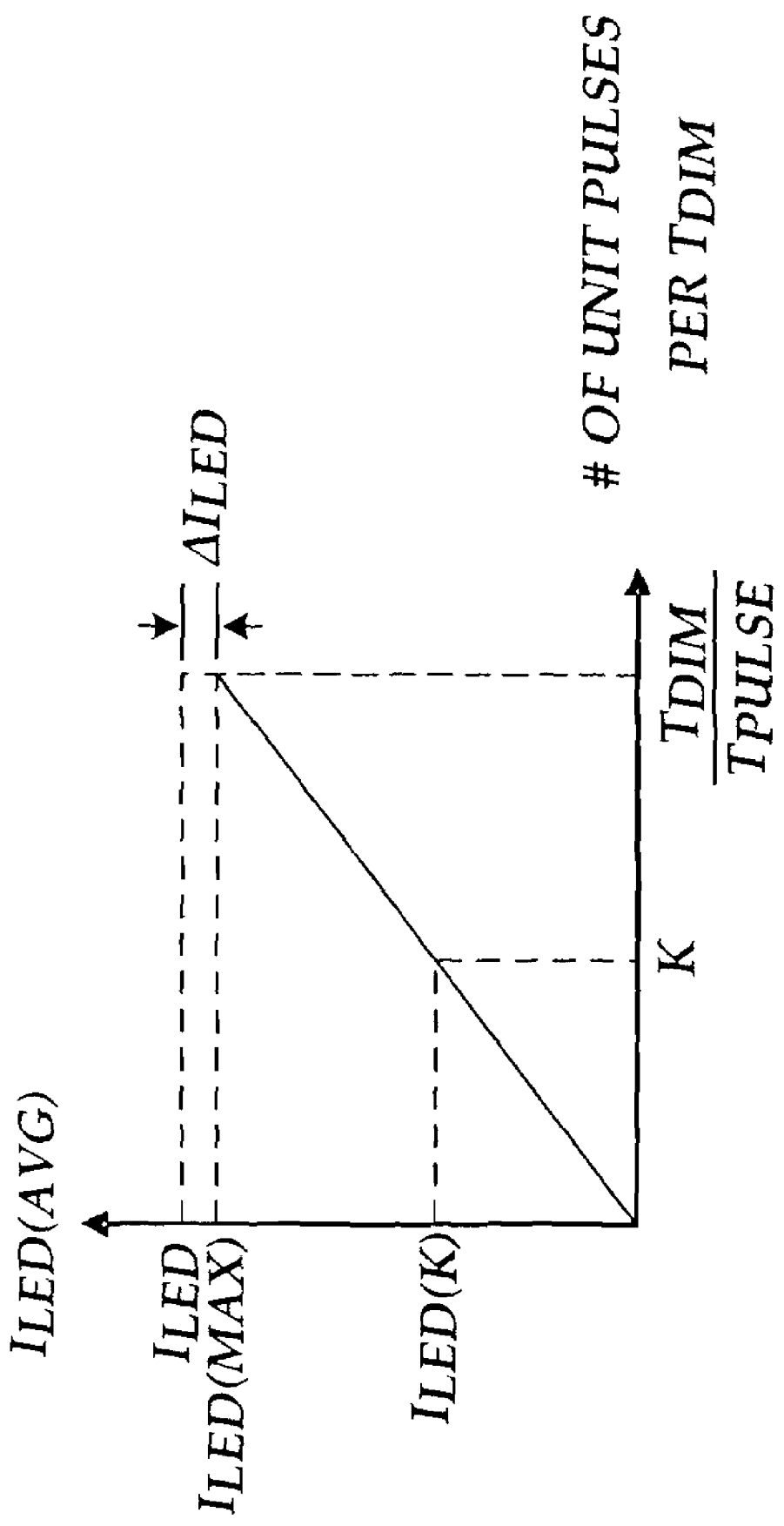
FIG. 8 illustrates a relationship between the average current provided to a load relative to the effective duty cycles of the waveforms of FIGS. 4 and 7.

FIG. 8 illustrates a relationship between the average current provided to a load relative to the number of unit pulses provided during each time interval $T_{dim}$ from one of FIGS. 4 and 7. FIG. 8 illustrates average current to the load $I_{LED(avg)}$ as being related to the number of unit pulses provided during each time interval $T_{dim}$ and the instantaneous current $I_{LED}$ which is provided to the load during on-times $T_{on}$. For example, when k unit pulses are provided during time interval $T_{dim}$, the resulting effective duty cycle equals $k*(T_{on}/T_{dim})$. Also, the resulting average current $I_{LED(avg)}=I_{LED(k)}=I_{LED}*k*(T_{on}/T_{dim})$. The maximum value of k is equal to $T_{dim}/T_{pulse}$. When this maximum number of unit pulses are provided during time interval $T_{dim}$, the resulting effective duty cycle equals $(T_{dim}/T_{pulse})*(T_{on}/T_{dim})$. Simplified, this equals $T_{on}/T_{pulse}$. Thus, the resulting average current $I_{LED(avg)}=I_{LED(max)}=I_{LED}*(T_{on}/T_{pulse})$.

In this example, $\Delta I_{LED}=(T_{off}*I_{LED})/(T_{pulse})$ and results from the off-time $T_{off}$ within each unit pulse. However, off-time $T_{off}$ may be any arbitrarily small time period, thus as off-time $T_{off}$ approaches zero, $I_{LED(max)}$ approaches $I_{LED}$ and $\Delta I_{LED}$ approaches zero.

In some embodiments, a processor readable medium has processor executable code stored therein. For example, in one embodiment, the processor code may be stored in an embodiment of pulse circuit 244 of FIG. 2, in which pulse circuit 244 includes a microprocessor core, memory, input/output registers, and a bus to interconnect these elements, as previously discussed, where the memory in pulse circuit 244 stores the processor executable code which may be executed by the microprocessor core in pulse circuit 244. The processor executable code, when executed by one or more processors, enables actions. The actions may include providing a plurality of unit pulses, wherein each unit pulse has a fixed on-time and a fixed off-time. Providing the plurality of unit pulses may includes providing a first determined number of unit pulses during a first time interval. The actions may further include providing a second determined number of unit pulses during a second time interval. In these embodiments, the second determined number of unit pulses is different from the first determined number of unit pulses. Also, in these embodiments, the first time interval has the same duration as the second time interval, the first time interval is consecutive with the second time interval, the first determined number is not zero, and the second determined number is not zero.

Further, in some embodiments, the processor readable medium enables providing the first determined number of unit pulses during a first time interval by providing the first determined number of unit pulses at substantially evenly spaced intervals during the first time interval.

Further, in some embodiments, the computer readable medium, when executed by one or more processors, enables an illumination intensity associated with the illumination device to be changed without changing an emitted color spectrum of the illumination.

The above specification, examples and data provide a description of the method and applications, and use of the invention. Since many embodiments of the invention can be made without departing from the spirit and scope of the invention, this specification merely set forth some of the many possible embodiments for the invention.

What is claimed as new and desired to be protected by Letters Patent of the United States is:

1. A method of controlling current, comprising:
   adjusting an illumination intensity, including
      providing a plurality of unit pulses during a plurality of consecutive time intervals, wherein each unit pulse of the plurality of unit pulses has a fixed on-time of a first duration and a fixed off-time of a second duration, wherein each time interval of the plurality of consecutive time intervals is of a third duration, and wherein providing the plurality of unit pulses includes:
         providing a first determined number of unit pulses of the plurality of unit pulses during a first time interval of the plurality of consecutive time intervals; and
         providing a second determined number of unit pulses of the plurality of unit pulses during a second time interval of the plurality of consecutive time intervals, wherein the second determined number of unit pulses of the plurality of unit pulses is different from the first determined number of unit pulses of the plurality of unit pulses, and wherein the first determined number is not zero and the second determined number is not zero.

2. The method of claim 1, wherein providing the first determined number of unit pulses during a first time interval includes:
   providing the first determined number of unit pulses at substantially evenly spaced intervals during the first time interval.

3. The method of claim 1, wherein the illumination intensity is based, at least in part, on the number of unit pulses provided during the first time interval of the plurality of consecutive time intervals.

4. The method of claim 1, wherein providing the plurality of unit pulses enables control of the illumination intensity, the illumination intensity is associated with an illumination device, and wherein the illumination device includes at least one of a light emitting diode circuit or an electroluminescent circuit.

5. The method of claim 1, wherein providing the plurality of unit pulses enables an illumination intensity associated with an illumination device to be changed without changing an emitted color spectrum of the illumination.

6. The method of claim 1, wherein the plurality of consecutive time intervals includes at least ten time intervals.

7. The method of claim 1, wherein adjusting the illumination intensity further includes:
   providing a third determined number of unit pulses of the plurality of unit pulses during a third time interval of the plurality of consecutive time intervals, wherein the third time interval is before the first time interval; and
   providing a fourth determined number of unit pulses of the plurality of unit pulses during a fourth time interval of the plurality of consecutive time intervals, wherein the fourth time interval is after the first time interval and is before the second time interval, and wherein the fourth determined number of unit pulses is zero.

8. The method of claim 1, wherein the providing the first determined number of unit pulses of the plurality of unit pulses is based, at least in part, on a value of an input signal.

9. The method of claim 1, wherein adjusting the illumination intensity further includes:
   providing a current to an illumination device during the on-time of each unit pulse, such that the magnitude of the provided current is substantially constant, and such that during the off-time of each unit pulse, substantially zero current is provided to the illumination device.

10. The method of claim 9, wherein the magnitude of the provided current determines an emitted color spectrum of the illumination.

11. An illumination device control circuit, comprising:
    a controller, including:
       a timing circuit that is arranged to provide at least one timing signal; and
       a pulse circuit that is arranged to:
          receive the at least one timing signal;
          provide, based at least in part on the at least one timing signal, a first determined number of unit pulses during a first time interval of a plurality of consecutive time intervals; and
          provide, based at least in part on the at least one timing signal, a second determined number of unit pulses during a second time interval of the plurality of consecutive time intervals, wherein the second determined number of unit pulses is different from the first determined number of unit pulses, wherein each unit pulse has a fixed on-time of a first duration and a fixed off-time of a second duration, wherein each time interval of the plurality of consecutive time intervals is of a third duration, wherein the first determined number is not zero and the second determined number is not zero, and wherein a switch control signal is asserted during the on-time of each unit pulse.

12. The circuit of claim 11, further comprising:
    a switch circuit that is substantially closed while the switch control signal is asserted and substantially open while the switch control signal is unasserted; and
    a current source that is arranged to provide a substantially constant current to an illumination device while the switch circuit is closed.

13. The circuit of claim 11, further comprising:
    an illumination device, wherein the illumination device includes at least one of a light emitting diode circuit or an electroluminescent circuit; and
    a current source that is arranged to provide a substantially constant current to the illumination device while the switch circuit is open.

14. The circuit of claim 11, wherein the controller includes a microcontroller.

15. The circuit of claim 11, wherein the pulse circuit includes a one-shot circuit.

16. The circuit of claim 11, further comprising:
    an analog-to-digital converter, wherein the analog-to-digital converter is arranged to receive an input signal and to provide a digital output signal based, at least in part, on the input signal; and wherein the digital output signal controls, at least in part, the first determined number of unit pulses.

17. The circuit of claim 11, wherein the controller is arranged to enable an illumination intensity associated with the illumination device to be changed without changing an emitted color spectrum of the illumination.

18. A processor readable medium having processor executable code stored therein, which when executed by one or more processors, enables actions, comprising:

adjusting an illumination intensity, including
  providing a plurality of unit pulses, wherein each unit pulse has a fixed on-time and a fixed off-time, wherein providing the plurality of unit pulses, includes:
    providing a first determined number of unit pulses during a first time interval; and
    providing a second determined number of unit pulses during a second time interval, wherein the second determined number of unit pulses is different from the first determined number of unit pulses, and wherein the first time interval has the same duration as the second time interval, wherein the first time interval is consecutive with the second time interval, and wherein the first determined number is not zero and the second determined number is not zero.

19. The processor readable medium of claim 18, wherein the processor readable medium, enables providing the first determined number of unit pulses during a first time interval by:
  providing the first determined number of unit pulses at substantially evenly spaced intervals during the first time interval.

20. The processor readable medium of claim 18, wherein the computer readable medium, when executed by one or more processors, enables an illumination intensity associated with the illumination device to be changed without changing an emitted color spectrum of the illumination.

* * * * *